US006775456B2

(12) United States Patent
Matsuura

(10) Patent No.: US 6,775,456 B2
(45) Date of Patent: Aug. 10, 2004

(54) CONDUCTOR CONNECTING APPARATUS

(75) Inventor: Hideki Matsuura, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 158 days.

(21) Appl. No.: 10/143,010

(22) Filed: May 13, 2002

(65) Prior Publication Data
US 2002/0166226 A1 Nov. 14, 2002

(30) Foreign Application Priority Data
May 14, 2001 (JP) .......................... 2001-142588

(51) Int. Cl.⁷ .............................. G02B 6/38; G02B 6/00
(52) U.S. Cl. .................... 385/135; 385/59; 385/134; 385/137
(58) Field of Search ........................ 385/59, 57, 89, 385/75, 8, 134, 135, 136, 137

(56) References Cited

U.S. PATENT DOCUMENTS 4,312,564 A * 1/1982 Cefarelli et al. .............. 385/59
5,497,444 A * 3/1996 Wheeler ..................... 385/135
6,591,051 B2 * 7/2003 Solheid et al. .............. 385/134

* cited by examiner

Primary Examiner—John R. Lee
Assistant Examiner—James P. Hughes
(74) Attorney, Agent, or Firm—McDermott Will & Emery LLP

(57) ABSTRACT

An optical fiber connecting unit includes a first and a second support members 33 and 34 hinged to a fixed member 37 to be swingable about a common axis 38. The first and second support members 33 and 34 are movable between a position for aligning in an alternating arrangement, and a position for separating from each other, adaptors 31 supported by the first support member 33 and adaptors supported by the second support member.

6 Claims, 5 Drawing Sheets

CONDUCTOR CONNECTING APPARATUS

BACKGROUND OF THE INVENTION

1. Field of the Invention

The present invention relates to a conductor connecting apparatus for connecting connectors disposed at ends of numerous conductors to corresponding adaptors.

2. Description of the Related Art

When connecting optical fibers to each other, for example, a connector disposed at an end of one optical fiber is connected to an adaptor disposed at an end of the other optical fiber. To connect corresponding connectors to a plurality of adaptors, a connecting apparatus that fixes the adaptors to a support member is provided beforehand, and corresponding connectors are attached to the respective adaptors fixed to the support member.

When connecting corresponding connectors to numerous adaptors, the connectors and adaptors must be arranged in high density within a limited area. Thus, where the numerous adaptors are arranged close to one another on the support member, an attempt to detach a connector from an adaptor is hampered by the presence of adjacent connectors. There arises an inconvenience that a required connector cannot be detached from an adapter without using a jig dedicated to this purpose.

On the other hand, where the adaptors are fixed with certain spaces therebetween to the support member, the adaptors occupy a large area for arrangement. This results in a disadvantage of enlarging the connecting apparatus.

SUMMARY OF THE INVENTION

The object of the present invention, therefore, is to provide a conductor connecting apparatus for allowing connectors to be detached from adaptors with ease even where the adaptors are arranged in high density within a limited area.

The above object is fulfilled, according to the present invention, by a conductor connecting apparatus for connecting connectors disposed at ends of numerous conductors to corresponding adaptors, the apparatus comprising a first and a second support members for supporting a plurality of adaptors in an alternating arrangement, and a support mechanism for supporting at least one of the first and second support members to be movable between a position for aligning in the alternating arrangement, and a position for separating from each other, the adaptors supported by the first support member and the adaptors supported by the second support member.

This conductor connecting apparatus allows the connectors to be detached from the adaptors with ease even where the adaptors are arranged in high density within a limited area.

Preferably, the first support member and the second support member are hinged to a common axis.

This achieves a simple construction for supporting at least one of the first and second support members to be movable between the position for aligning in the alternating arrangement, and the position for separating from each other, the adaptors supported by the first support member and the adaptors supported by the second support member.

In another aspect of the invention, a conductor connecting apparatus is provided for connecting connectors disposed at ends of numerous conductors to corresponding adaptors, the apparatus comprising a first support member for supporting a plurality of adaptors at fixed intervals, a second support member for supporting a plurality of adaptors at the fixed intervals, and a support mechanism for supporting at least one of the first support member and the second support member to be movable between a position for aligning in an alternating arrangement, and a position for separating from each other, the adaptors supported by the first support member and the adaptors supported by the second support member.

In a further aspect of the invention, a conductor connecting apparatus is provided for connecting connectors disposed at ends of numerous conductors to corresponding adaptors, the apparatus comprising an axis fixed to a main body, a first support member hinged to the axis for supporting a plurality of adaptors at fixed intervals, and a second support member hinged to the axis for supporting a plurality of adaptors at the fixed intervals, wherein at least one of the first support member and the second support member is swingable about the axis between a position for aligning in an alternating arrangement, and a position for separating from each other, the adaptors supported by the first support member and the adaptors supported by the second support member.

Other features and advantages of the present invention will be apparent from the following detailed description of the embodiment of the invention.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DESCRIPTION OF THE PREFERRED EMBODIMENT

An embodiment of the present invention will be described hereinafter with reference to the drawings.

Figure 1:
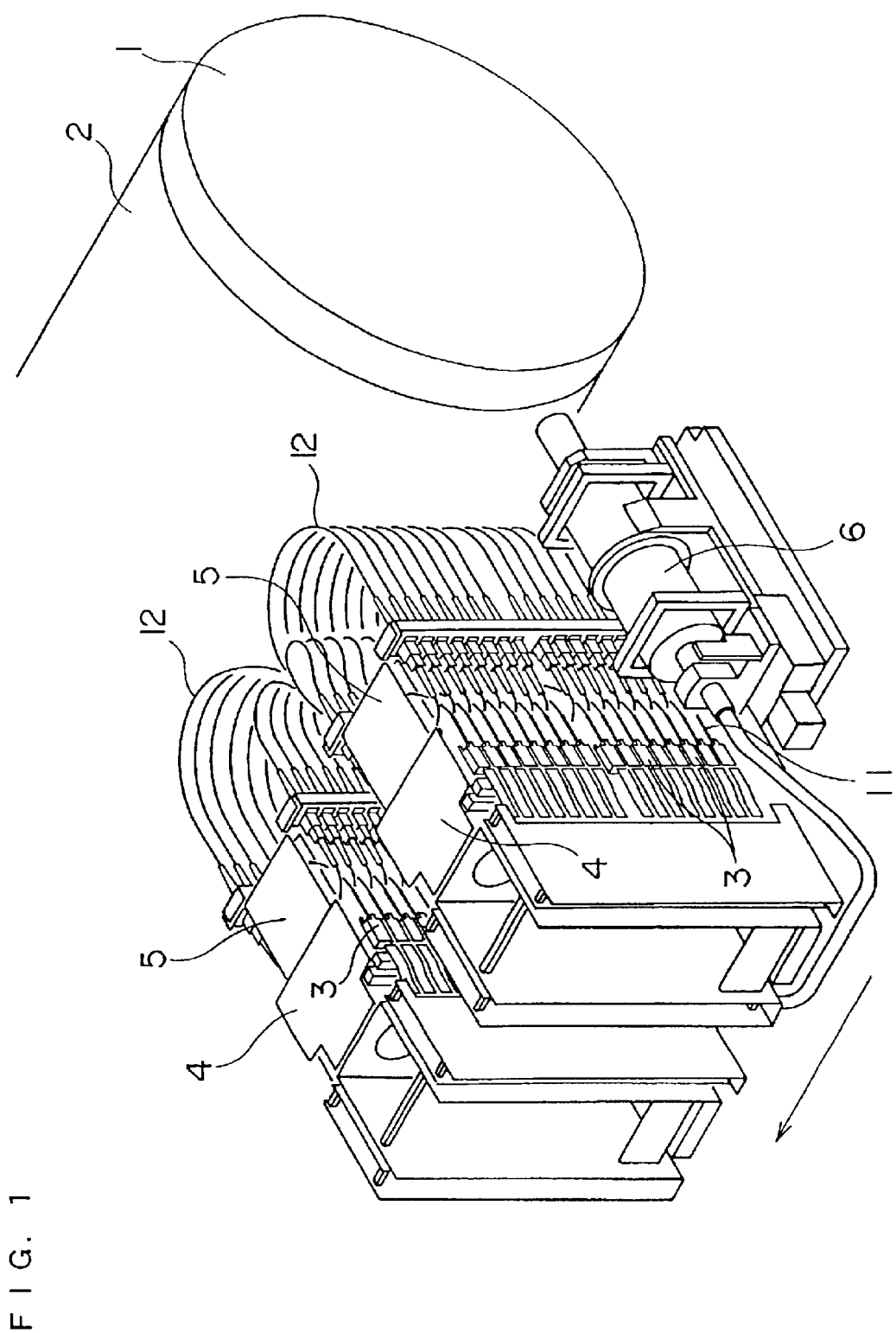
FIG. 1 is a perspective view of a principal portion of an image recording apparatus including a device supporting assembly.

The construction of an image recording apparatus having a conductor connecting unit according to the invention will be described first. FIG. 1 is a perspective view of a principal portion of the image recording apparatus including the conductor connecting unit according to the invention.

This image recording apparatus is used to record images on a sensitive material 2 mounted peripherally of a drum 1 by emitting a laser beam from an imaging optical system 6. The apparatus includes a device supporting assembly 4 for supporting numerous semiconductor lasers 3 acting as devices requiring temperature control, and the slack storage assembly 5 for supporting numerous optical fibers 11 optically connecting the semiconductor lasers 3 to the imaging optical system 6.

In this image recording apparatus, the imaging optical system 6 emits a laser beam modulated according to image signals while the drum 1 is rotated by a motor not shown, and a recording head having the device supporting assembly 4, slack storage assembly 5 and imaging optical system 6 is moved in a direction indicated by an arrow in FIG. 1. In this way, the laser beam scans the sensitive material 2 to record an image thereon.

Figure 2:
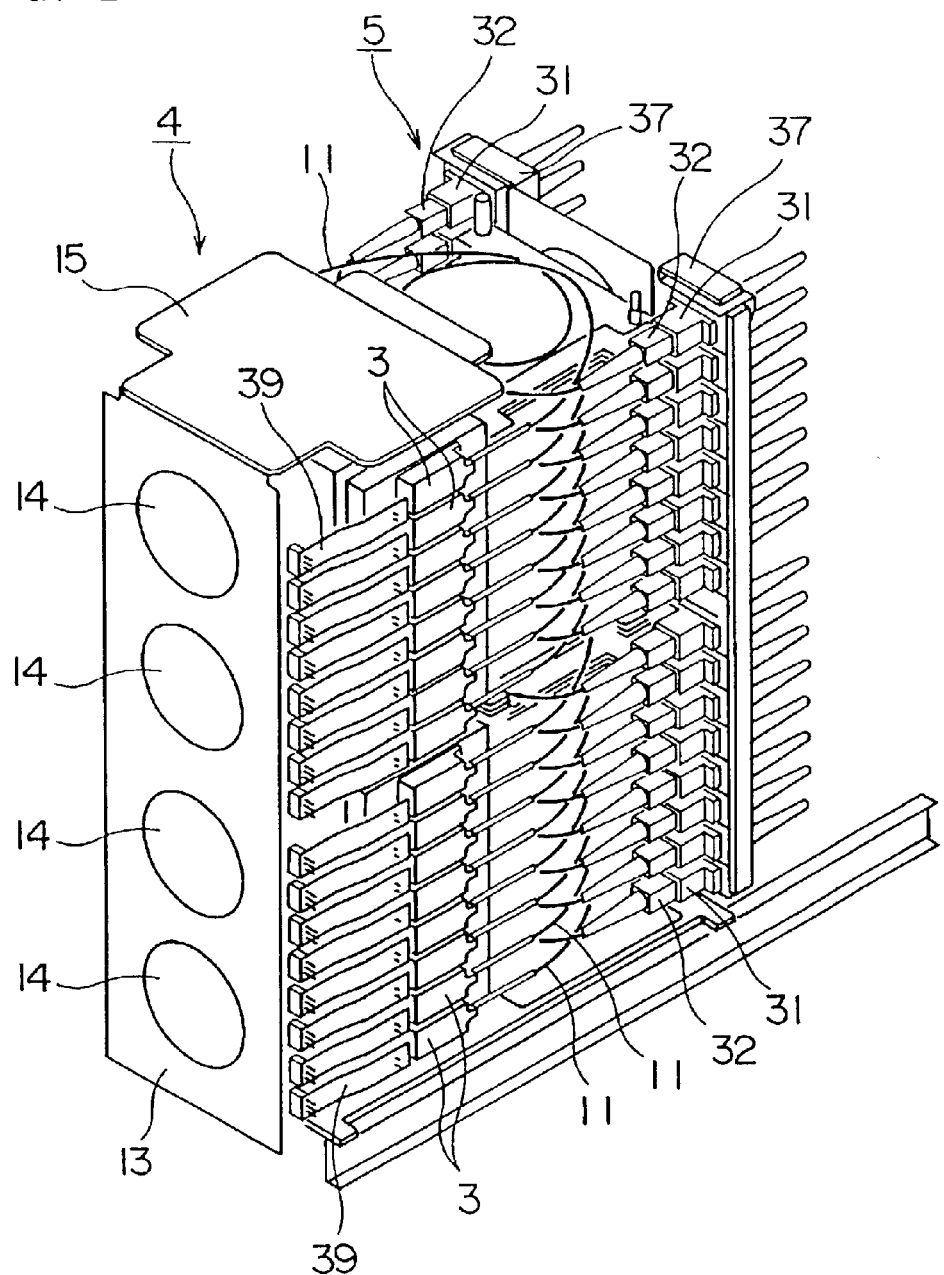
FIG. 2 is an enlarged perspective view of a portion of the image recording apparatus including the device supporting assembly and a slack storage assembly.

FIG. 2 is an enlarged perspective view of a portion of the image recording apparatus including the device supporting assembly 4 and slack storage assembly 5 shown in FIG. 1. FIG. 2 shows only one half of the device supporting assembly 4 and one half of the slack storage assembly 5 provided for the image recording apparatus.

One half of the device supporting assembly 4 supports a total of 32 semiconductor lasers 3 arranged on right and left side surfaces thereof (only 16 lasers on the right side surface being shown in FIG. 2). The device supporting assembly 4 has a top plane closed by a cover 15, and a rear plane closed by a cover 13. The cover 13 defines vent openings 14.

Each semiconductor laser 3 is connected at an exit end thereof to one of the optical fibers 11. The end of each optical fiber 11 remote from the semiconductor laser 3 is connected to a connector 32. The portion of each optical fiber 11 extending from the semiconductor laser 3 to the connector 32 is fixedly supported by the slack storage assembly 5. Each connector 32 is connected to an adaptor 31. These adaptors 31 are connected to optical fibers 12 connected to the imaging optical system 6 (FIG. 1). Numeral 39 in FIG. 2 denotes transmission lines for transmitting electrical signals to drive the respective semiconductor lasers 3.

The construction of the optical fiber connecting unit acting as the conductor connecting apparatus according to the invention will be described next. This optical fiber connecting unit is used to connect the connectors 32 disposed at the ends of the optical fibers 11 to the adaptors 31 disposed at the ends of the optical fibers 12.

Figure 3:
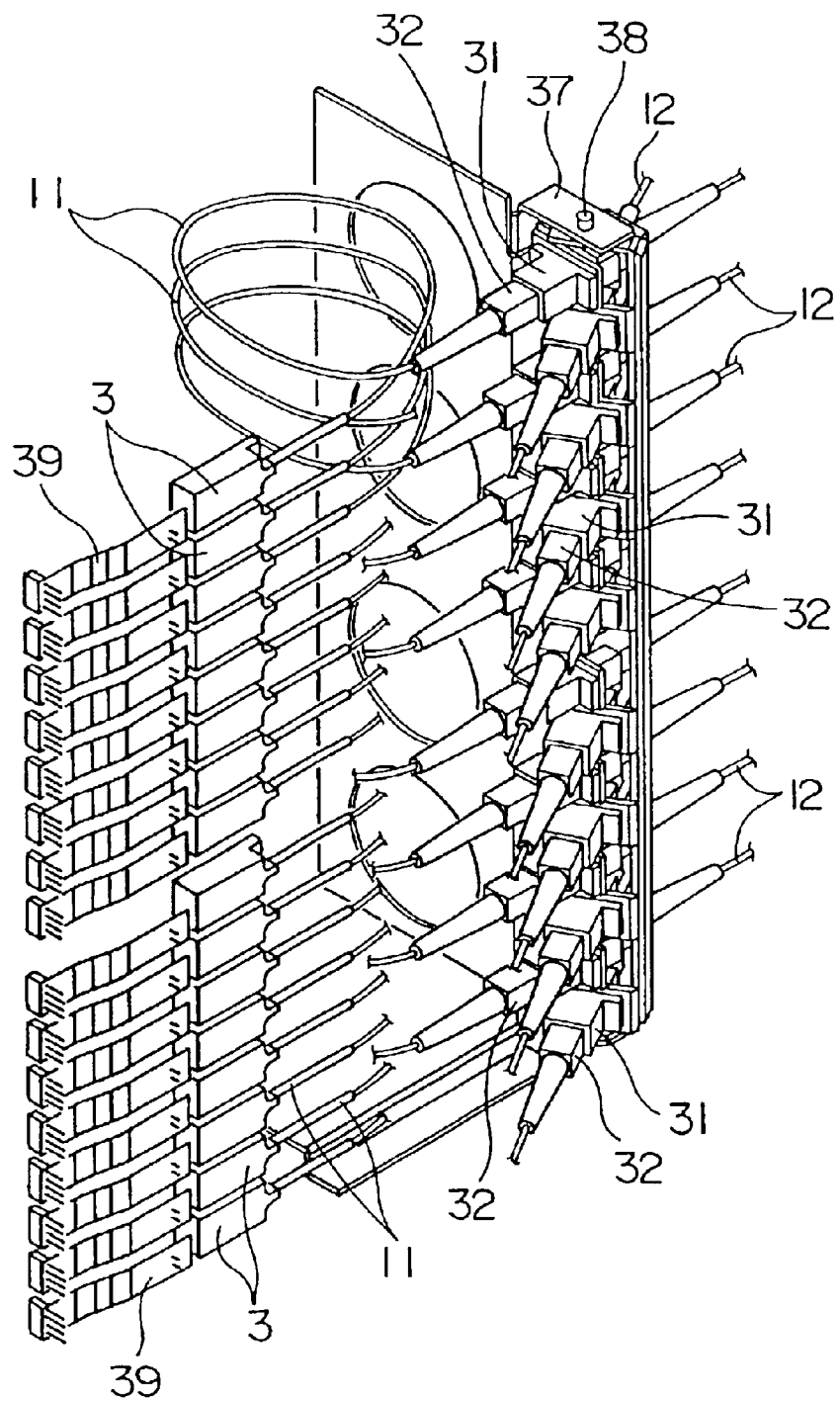
FIG. 3 is a perspective view showing an optical fiber connecting unit along with semiconductor lasers.
Figure 4:
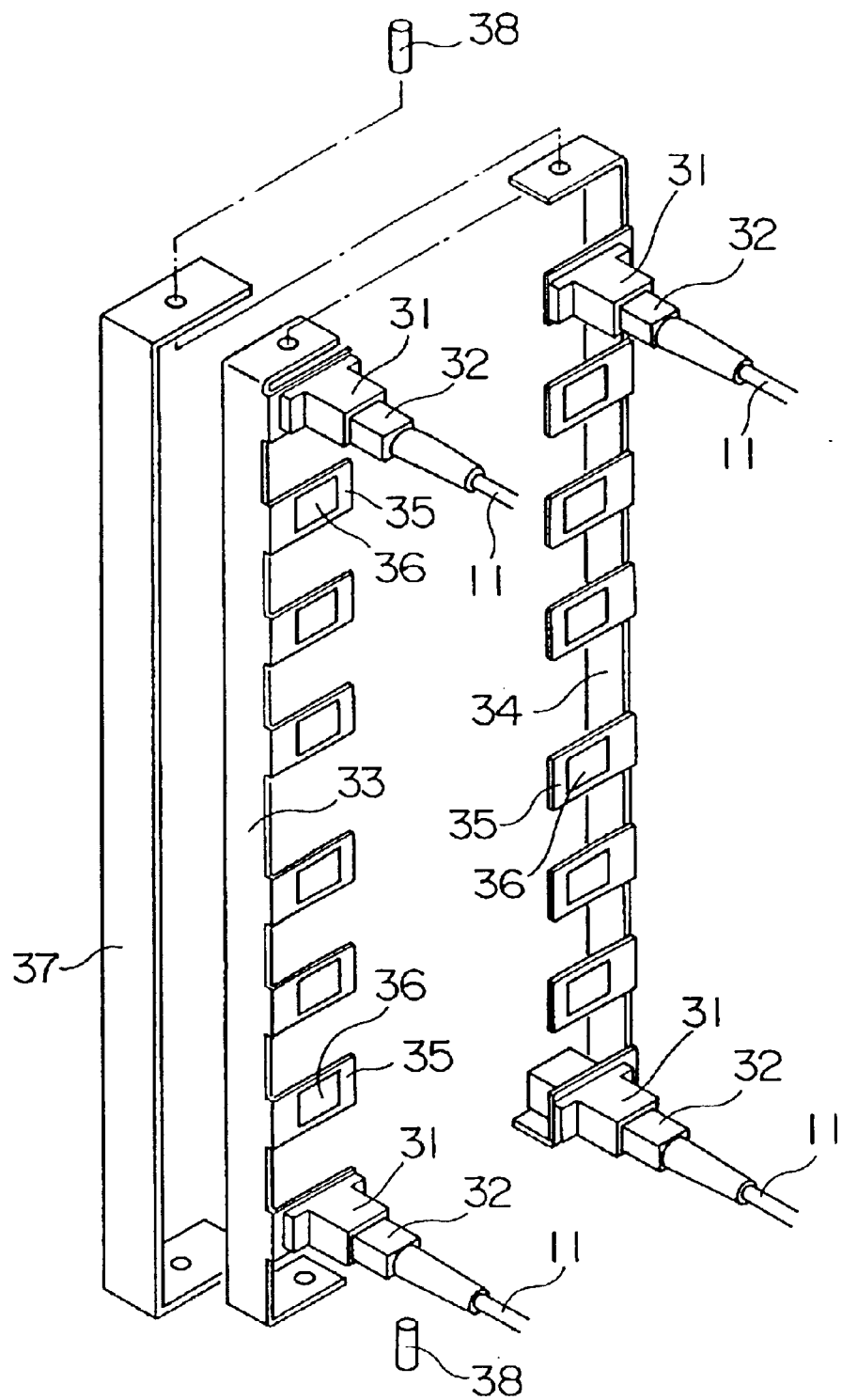
FIG. 4 is an exploded perspective view of the optical fiber connecting unit.
Figure 5:
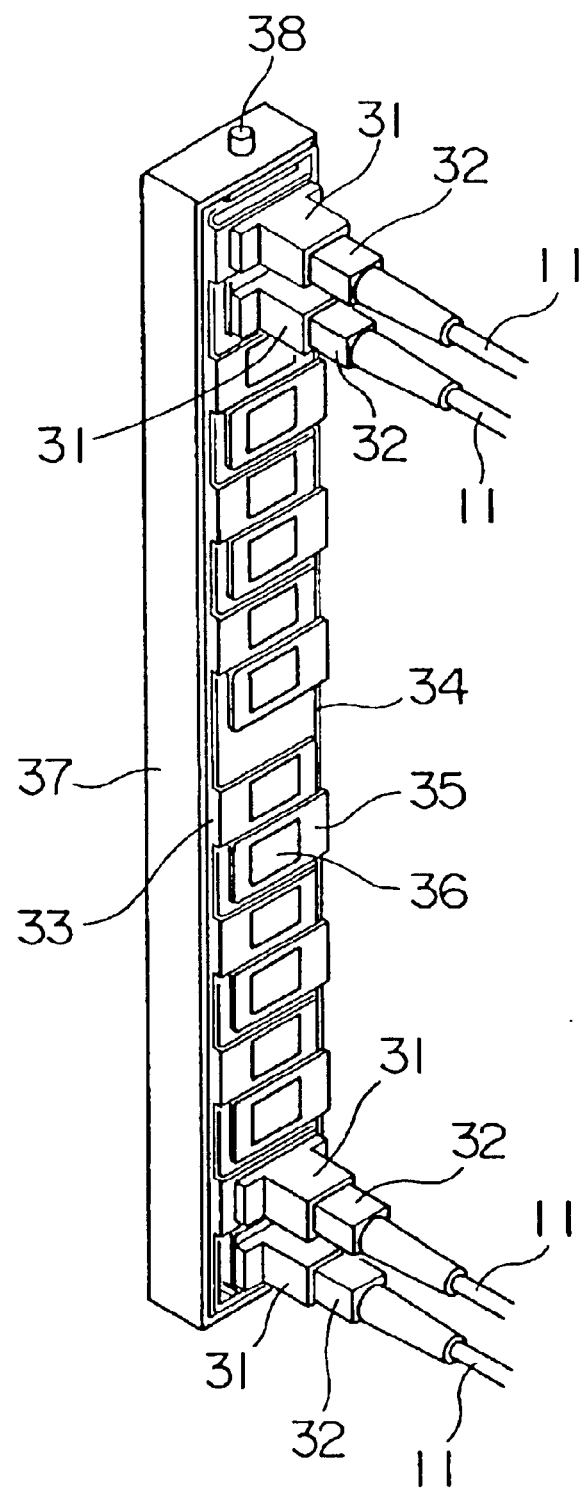
FIG. 5 is a perspective view of the optical fiber connecting unit in an assembled state.

FIG. 3 is a perspective view showing the optical fiber connecting unit along with the semiconductor lasers 3. FIG. 4 is an exploded perspective view of the optical fiber connecting unit. FIG. 5 is a perspective view of the optical fiber connecting unit in an assembled state.

This optical fiber connecting unit includes a fixed member 37 fixed to a main body of the apparatus, and a first and a second support members 33 and 34 hinged to the fixed member 37 to be swingable about a common axis 38.

As shown in FIGS. 4 and 5, each of the first and second support members 33 and 34 has eight lugs 35 defining openings 36. Eight adaptors 31 are attached to these lugs 35. For expediency of illustration, FIGS. 4 and 5 show only four adaptors 31 and the twelve other adaptors 31 are omitted therefrom.

The lugs 35 on the first and second support members 33 and 34 are staggered or alternately arranged so that the lugs 35 on the first support member 33 fit between the lugs 35 on the second support member 34. Thus, as shown in FIG. 5, the adaptors 31 supported by the first support member 33 and the adaptors 31 supported by the second support member 34 are in an alternating arrangement.

As noted above, the first and second support members 33 and 34 are hinged to the fixed member 37 to be swingable about the common axis 38. Thus, the first and second support members 33 and 34 are movable between a position shown in FIG. 5 in which the adaptors 31 supported by the first support member 33 and the adaptors 31 supported by the second support member 34 are aligned in the alternating arrangement, and a position shown in FIG. 3 in which the adaptors 31 supported by the first support member 33 and the adaptors 31 supported by the second support member 34 are separated from or out of alignment with each other.

When inserting the connector 32 into the adaptors 31 or pulling the connectors 32 out of the adaptors 31, the first and second support members 33 and 34 are placed in the position shown in FIG. 3 to separate the adaptors 31 supported by the first support member 33 and the adaptors 31 supported by the second support member 34 from each other. By placing the first and second support members 33 and 34 in this position, each connector 32 may be attached or detached without being obstructed by adjacent connectors 32. Thus, the connectors 32 may be attached or detached without using a jig or the like dedicated to this purpose.

After completing an operation to attach the connectors 32, the adaptors 31 supported by the first support member 33 and the adaptors 31 supported by the second support member 34 are aligned in the alternating arrangement as shown in FIG. 5. This allows the connectors 32 and adaptors 31 to be arranged in high density in a narrow area.

In the above embodiment, the adaptors 31 supported by the first support member 33 and the adaptors 31 supported by the second support member 34 are arranged to alternate at every adaptor 31. Instead, the adaptors 31 supported by the first support member 33 and the adaptors 31 supported by the second support member 34 may be arranged to alternate at every two adaptors 31.

In the above embodiment, the first support member 33 and second support member 34 are both movable. Instead, one of the first support member 33 and second support member 34 may be fixed, only the other being movable.

In the above embodiment, the first support member 33 and second support member 34 are hinged to be swingable about the common axis 38 between the position for aligning in the alternating arrangement, and the position for separating from each other, the adaptors 31 supported by the first support member 33 and the adaptors 31 supported by the second support member 34. However, the first and second support members 33 and 34 may be moved, for example, sideways relative to each other between a position for aligning in the alternating arrangement, and a position for separating from each other, the adaptors 31 supported by the first support member 33 and the adaptors 31 supported by the second support member 34.

Further, in the above embodiment, the optical fibers 11 and 12 are used as conductors, and the connecting apparatus connects the connectors 32 disposed at the ends of the optical fibers 11 and the adaptors 31 disposed at the ends of the optical fibers 12. The invention is applicable also to connecting apparatus for connecting other types of conductors such as power supply lines or signal lines.

The present invention may be embodied in other specific forms without departing from the spirit or essential attributes thereof and, accordingly, reference should be made to the appended claims, rather than to the foregoing specification, as indicating the scope of the invention.

This application claims priority benefit under 35 U.S.C. Section 119 of Japanese Patent Application No. 2001-142588 filed in the Japanese Patent Office on May 14, 2001, the entire disclosure of which is incorporated herein by reference.

What is claimed is:

1. A conductor connecting apparatus for connecting connectors disposed at ends of numerous conductors to corresponding adapters, said apparatus comprising:

a first support member for supporting a plurality of adaptors arranged in a predetermined direction;

a second support member for supporting a plurality of adapters arranged in a direction parallel to said predetermined direction; and a support mechanism for supporting said first and second support members both in an aligning position for aligning said first and second support members and in a separating position for separating said first and second support members from each other, wherein at least one of said first and second support members is movable with respect to said support mechanism in a direction traverse to said predetermined direction, such that in said aligning position said adaptors supported by said first support members fit between said adaptors supported by said second support members.

2. The conductor connecting apparatus as defined in claim 1, wherein said support mechanism includes an axis to which said at least one of said first and second support members is swingably hinged.

3. A conductor connecting apparatus for connecting connectors disposed at ends of numerous conductors to corresponding adaptors, said apparatus comprising:

an axis fixed to a main body;

a first support member hinged to said axis for supporting a plurality of adopters at fixed intervals; and a second support member hinged to said axis for supporting a plurality of adopters at said fixed intervals;

wherein at least one of said first support member and said second support member is swingable about said axis between a position for aligning in an alternating arrangement, and a position for separating from each other, said adaptors supported by said first support member and said adaptors supported by said second support member.

4. The conductor connecting apparatus as defined in claim 2, wherein said adaptors supported by said first support member and said adaptors supported by said second support member are arranged to alternate at every adaptor in said aligning position.

5. The conductor connecting apparatus as defined in claim 2, wherein said adaptors supported by said first support member and said adaptors supported by said second support member are arranged to alternate at every two adaptors in said aligning position.

6. The conductor connecting apparatus as defined in claim 1, wherein at least one of said first and second support members is sideways movable with respect to said support mechanism.

* * * * *